Patented Feb. 19, 1952

2,585,905

UNITED STATES PATENT OFFICE 2,585,905

QUATERNARY SALTS OF PYRIMIDYL-AMINOQUINOLINES

Arthur Donald Ainley and Francis Henry Swinden Curd, Blackley, Manchester, England, assignors to Imperial Chemical Industries Limited, a corporation of Great Britain No Drawing. Application August 13, 1948, Serial No. 44,235. In Great Britain August 22, 1947

11 Claims. (Cl. 260—256.4)

This invention relates to quarternary salts of pyrimidylaminoquinolines and more particularly it relates to a process for the manufacture of the mono- and di-quaternary salts of pyrimidylaminoquinolines possessing trypanocidal activity.

According to our invention we make the said new compounds, which are of the formula Pq—NH—A wherein P stands for a 2-, 4- (or 6-) amino-substituted pyrimidine nucleus which is attached to the linking —NH— group at another of the 2-, 4- (or 6-) positions and which may be further substituted in the remaining 2-, 4- (or 6-) position by a lower alkyl radical or an amino group, A stands for Q or for Qq, wherein Q stands for a quinoline nucleus which is substituted in the 2- or 4-position by an amino group and which may be further substituted by a lower alkyl group or groups, and which bears the linking —NH— group in the 6-position and the symbols q indicate that the preceding nuclei P and Q respectively, are present in the form of their quaternary salts, by a process which comprises reacting a compound of the formula PqX wherein P and q have the significance stated above and X stands for a halogen atom or the group —SR, wherein R stands for a hydrocarbon radical, with a compound of the formula NH₂A wherein A has the significance stated above.

The starting materials of the formula PqX may be made by the process described in co-pending U. S. Application Ser. No. 44,234, filed August 13, 1948, namely by the treatment of the substituted pyrimidine derivative PX with a quaternary salt-forming agent for example with methyl iodide, dimethylsulphate, diethyl sulphate, or methyl p-toluene sulphonate.

The process of the invention may be carried out by heating the reactants together conveniently but not necessarily in a liquid medium and in presence of an acid. Suitable liquid media include for example water and suitable acids include for example hydrochloric acid. The substance NH₂A may, if desired, be used in the form of a salt thereof. The substance NH₂A may, moreover, be added to the reaction mixture in the form of a substance which will give rise to the substance NH₂A under the conditions of reaction, for example in the form of an acyl derivative thereof.

The products of this invention may, as indicated above, be represented by the generic formula PqNHA wherein the symbols are as designated hereinbefore. We have found that substances which conform to this formula possess the property in common of powerful trypanocidal activity as tested in mice against Trypanosoma species. Thus for example we have found that 4-amino-6-(2'-amino-6'-methylpyrimidyl-4'-amino) quinaldine 1:1'-dimethiodide and the corresponding dimethochloride and di(methomethylsulphate), when administered, subcutaneously at a dose of 1.25 mg. per kg. of mouse weight, into mice infected with Trypanosoma cengolense, produce 100% recovery of the mice without serious local or general, immediate or delayed, toxic effect. Moreover 4-amino-6-(2'-amino-6'-methylpyrimidyl-4'-amino) quinaldine 1:1'-dimethochloride is active against Trypanosoma cengolense in cattle, against T. evansii in camels, against T-simiae in pigs and against T-equiperdum, T. equinum and T. brucei in mice. Studied against T. cengolense in cattle it has been found to possess, besides a curative effect in infected cattle, also a prophylactic effect in healthy cattle. Thus a dose of 1 mg. per kg. animal weight renders the animal resistant to infections by T. cengolense during a period of at least three months following inoculation.

A preferred class of compounds for use as veterinary trypanocides may be represented by the formula

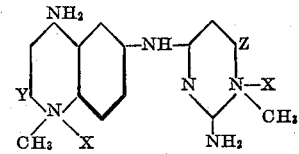

wherein X represents an anionic radical and Y and Z stand for hydrogen or methyl groups and are not necessarily the same.

Some of the new compounds of this invention may be made also by the process of co-pending U. S. application Ser. No. 44,236 filed August 13, 1948, namely those of the formula Pq—NH—Qq. Although these substances are described and represented herein as diquaternary salts of pyrimidylaminoquinolines it will be understood that they can also be formulated and named as salts of mono-quaternary salts of dihydropyrimidylaminoquinolines or of pyrimidylaminodihydroquinolines or again as di-salts of dihydropyrimidyl aminodihydroquinolines. Thus the substance named herein as 4-amino-6-(2'-amino-6'-methylpyrimidyl-4'-amino) quinaldine 1:1'-dimethiodide (and which may also be named 4-amino-6-(2'-amino-6'-methylpyrimidyl-4'-amino)-1-methylquinaldinium iodide 1'-methiodide) may be regarded as 4-amino-6-(2'- imino - 1':6' - dimethyl - 1':2' - dihydropyrimidyl - 4' - amino)quinaldine 1 - methiodide hydriodide, or as 4-imino-1-methyl-6-(2'-amino-6' - methylpyrimidyl - 4' - amino) - 1:4 - dihydroquinaldine 1'-methiodide hydroiodide, or again as 4 - imino - 1 - methyl - 6 -(2' - imino - 1':6 - dimethyldihydropyrimidyl - 4' -amino) - 1:4-dihydroquinaldine dihydriodide.

The invention is illustrated but not limited by the following examples in which the parts are by weight.

*Example 1*

5.7 parts of 2-chloro-4-methyl-6-amino-pyrimidine-3-methiodide, 4.23 parts of 4:6-diaminoquinaldine methochloride, 3 parts of water and 4 parts of 5N-hydrochloric acid are boiled together for one hour. The mixture is then filtered and the residual solid is dissolved in 50 parts of hot water. One part of sodium carbonate are added followed by 12 parts of sodium iodide. The solid is filtered off and recrystallised from water. It has M. P. 296-298° C. and consists of 4 - amino - 6 - (6' - amino - 4' - methylpyrimidyl - 2'-amino)quinaldine 1:3'-methiodide.

*Example 2*

13 parts of 4:6-diaminoquinaldine methochloride hydrochloride, 14.3 parts of 4-chloro-2-amino-6-methylpyrimidine 1-methiodide, and 200 parts of water are boiled together for 45 minutes. The mixture is then cooled and filtered and the residual solid dissolved in 125 parts of hot water, 1 part of a 10% aqueous solution of sodium carbonate is added, followed by 30 parts of sodium iodide. The precipitated solid is filtered off and crystallised from water. There is thus obtained 4 - amino - 6 - (2' - amino - 6' - methylpyrimidyl - 4'-amino)quinaldine 1:1'-dimethiodide of M. P. 312-313° C. (decomp.).

4 - amino - 6 - (2' - amino - 6' - methylpyrimidyl-4'-amino) quinaldine 1:1'-dimethiodide may be converted into the corresponding 1:1'-dimethochloride by taking 3 parts of it and dissolving it in 200 parts of boiling water, there being added to the solution either 10 parts of 7% aqueous hydrochloric acid or 35 parts of sodium chloride. The product is filtered off and crystallised from water. It forms colourless needles, M. P. 316-317° C. (decomp.). In a similar manner there may be obtained 4-amino-6-(2'-amino-6'-methylpyrimidyl - 4' - amino)quinaldine - 1:1' - dimethobromide which crystallises from water as colourless needles, M. P. 316° C. (decomp.).

*Example 3*

13 parts of 4:6-diaminoquinaldine methochloride hydrochloride and 18.85 parts of 4-iodo-2-amino - 6 - methylpyrimidine 3 - methiodide are mixed with 150 parts of water and the mixture boiled under reflux for 1 hour. The solid which separates is collected and the filtrate is treated with an excess of potassium iodide when a further precipitate is obtained. The combined solids are dissolved in 500 parts of water and 15 parts of 25% aqueous hydriodic acid and the solution is cooled in ice and filtered. The solid residue consists of 4-amino-6-(2'-amino-6'-methylpyrimidyl-4'-amino)quinaldine 1:3'-dimethiodide; M. P. 295-297° C. (decomp.).

The corresponding dimethochloride is obtained by dissolving 12 parts of the above dimethiodide in 500 parts of water and shaking the solution thoroughly with 17 parts of freshly precipitated silver chloride. It is then filtered and the filtrate is evaporated to dryness under reduced pressure and the residual solid is crystallised from a mixture of 40 parts of water and 160 parts of n-propyl alcohol. 4-amino-6-(2'-amino-6'-methylpyrimidyl - 4' - amino)quinaldine 1:3' - dimethochloride is thus obtained as pale cream prisms, M. P. 247° C. (decomp.).

When 15.8 parts of the above diiodide are dissolved in 500 parts of water and the solution is made alkaline to Brilliant yellow by the addition of 10% sodium carbonate solution there is precipitated 4 - amino - 6 - (2' - imino - 3':6' - dimethyl - 2:3 - dihydropyrimidyl - 4' - amino) quinaldine 1-methiodide [or 4 - amino - 6 - (2' - amino - 3':6' - dimethyl - 3:4 - dihydropyrimidyl - 4' - imino)quinaldine 1 - methiodide] as pale cream prisms, M. P. 328° C. (decomp.).

The starting material, 4:6-diaminoquinaldine methochloride hydrochloride is made in the following way:

45 parts of 4-amino-6-acetylaminoquinaldine are suspended in 400 parts of nitrobenzene and stirred and heated to 100° C. 28 parts of dimethyl sulphate are added slowly. The mixture is then heated at 100-105° C. for 1 hour. After cooling, the reaction mixture is filtered and the solid is washed free from nitrobenzene with acetone. There is thus obtained 68 parts of crude 4-amino-6-acetylaminoquinaldine methosulphate. This is dissolved in a mixture of 162 parts of concentrated hydrochloric acid and 70 parts of water and the solution is refluxed for 10 minutes. On cooling 4:6-diaminoquinaldine methochloride hydrochloride separates. It is filtered off and crystallised from 20% hydrochloric acid to give pale yellow needles, M. P. 298-299° C. (decomp.).

4:6-diaminoquinaldine methochloride is obtained by dissolving the above methochloride hydrochloride in water and making the solution alkaline to Brilliant yellow with sodium carbonate. The precipitated methochloride is filtered off and crystallised from 95% alcohol to give yellow crystals, M. P. 300-301° C. (decomp.).

Similarly, 4:6-diaminoquinaldine methiodide is obtained by dissolving 53 parts of the above methochloride hydrochloride in 500 parts of water, adding 125 parts of 10% sodium carbonate solution and then an excess of potassium iodide. The precipitated solid (61.5 parts) is collected and crystallised from 370 parts of 50% ethyl alcohol when it forms pale yellow needles, M. P. 278° C. (decomp.).

*Example 4*

3.35 parts of 4:6-diaminoquinaldine methochloride and 1.5 parts of 2-amino-4-methylthio-6-methylpyrimidine 1-methiodide are ground together and heated at 200-205° C. for 1.25 hours. The cooled reaction mixture is dissolved in 20 parts of hot water, a little hydrochloric acid is added to make the solution acid to Congo red and the solution is allowed to cool. The crystalline solid which separates is filtered off and crystallised from water. It is then dissolved in water and precipitated with potassium iodide to give 4-amino-6-(2'-amino - 6' - methylpyrimidyl-4'-amino)quinaldine 1:1'-dimethiodide which crystallises from water in colourless needles and has M. P. 311-313° C. (decomp.).

*Example 5*

15.7 parts of 4:6-diaminoquinaldine methiodide, 18.9 parts of 4-iodo-2-amino-6-methylpyrimidine 3-methiodide and 350 parts of water are boiled together under reflux for 1 hour. After cooling, the product which separates is collected and crystallised from 650 parts of water. There is thus obtained 4-amino-6-(2'-amino-6'-methylpyrimidyl - 4' - amino)quinaldine 1:3'-dimethiodide, M. P. 295° C. (decomp.), identical with the material described in Example 3.

*Example 6*

6.3 parts of 4:6-diaminoquinaldine 1-methiodide, 2.8 parts of 4-chloro-2:6-diaminopyrimidine 3-methiodide and 30 parts of water are boiled together under reflux for 5 hours. The product which separates on cooling is filtered off, and the filtrate is treated with an excess of potassium iodide. The precipitate is filtered off, the two crops are combined and the whole is triturated with 20 parts of 3.6% hydrochloric acid and filtered. The insoluble material is then dissolved in 80 parts of hot water and an excess of potassium iodide is added to precipitate 4-amino-6-(2':6'-diaminopyrimidyl - 4' - amino)quinaldine 1:3'-dimethiodide which crystallises from water as pale buff needles, M. P. 286–287° C. (decomp.).

*Example 7*

6.3 parts of 4:6-diaminoquinaldine methiodide, 2.86 parts of 4-chloro-2:6-diaminopyrimidine 1-methiodide and 30 parts of water are boiled together under reflux for 5 hours. On cooling, the mixture is filtered and the solid residue is triturated with 20 parts of 3.6% aqueous hydrochloric acid. The insoluble product is filtered off, dissolved in 75 parts of boiling water and treated with an excess of potassium iodide to give 4 - amino - 6(2':6' - diaminopyrimidyl-4'-amino) quinaldine 1:1'-dimethiodide which crystallises from water as pale cream prisms, M. P. 302° C. (decomp.).

*Example 8*

2.4 parts of 4:6-diaminoquinoline methiodide, 2.3 parts of 4-chloro-2-amino-6-methylpyrimidine 1-methiodide, and 20 parts of 1.5% hydrochloric acid are boiled together under reflux for 1 hour. After cooling, the product is filtered off and washed with a little cold water. It is then dissolved in 200 parts of hot water, treated with carbon and filtered. Addition of an excess of potassium iodide to the filtrate precipitates 4-amino-6-(2'-amino - 6' - methylpyrimidyl-4'-amino)quinoline 1:1'-dimethiodide which crystallises from 50% alcohol as pale yellow needles, M. P. 290° C. (decomp.).

The starting material 4:6-diaminoquinoline methiodide is prepared in the following manner:

7.8 parts of sodium hydroxide are dissolved in 95 parts of water, 46.7 parts of ethyl 6-acetylamino-4-hydroxyquinoline-2-carboxylate (Kermack and Weatherhead, J. Chem. Soc., 1940, 1167) are added and the mixture is boiled under reflux for 2 hours. 50 parts of water are then added, the solution treated with carbon and filtered. The sodium salt which separates on cooling is filtered off, washed with a little cold water and recrystallised from 200 parts of water. The thus purified sodium salt is dissolved in 800 parts of water and the solution is treated at the boil with 100 parts of 2N-acetic acid. The 6-acetylamino - 4 - hydroxyquinoline-2-carboxylic acid thus precipitated is filtered off, washed with water and dried. It has M. P. 322–323° C. (decomp.).

12 parts of 6-acetylamino-4-hydroxyquinoline-2-carboxylic acid, 120 parts of quinoline and 1.2 parts of copper bronze are stirred and boiled under reflux for 2 hours. After cooling, the product which separates is filtered off, washed with acetone and dried. The crude 6-acetylamino-4-hydroxyquinoline so obtained is purified by crystallisation from a large volume of water and then dried at 140° C. in vacuo for 6 hours. It then has M. P. 280–282° C.

28 parts of 4-hydroxy-6-acetylaminoquinoline, 75 parts of phosphorus oxychloride are mixed and the mixture is heated to 120–130° C. with stirring under reflux. This temperature is maintained until all the solid has passed into solution. The reaction mixture is cooled and added to a mixture of 1200 parts of ice and 527 parts of 37% aqueous sodium hydroxide solution. The precipitated product is filtered off, washed free from alkali with water, dried and crystallised from ethyl acetate to give 4-chloro-6-acetylaminoquinoline as colourless crystals, M. P. 223–224° C.

14.8 parts of 4-chloro-6-acetylaminoquinoline and 20 parts of phenol are heated together to 170–175° C. and ammonia is then passed in with stirring for 3.25 hours. The reaction mixture is then cooled, 100 parts of water are added with stirring and sodium hydroxide solution is added to make the solution alkaline to Clayton yellow. The precipitated 4-amino-6-acetylaminoquinoline is collected, washed with a little cold water, and crystallised from water when it is obtained as practically colourless crystals, M. P. 244–245° C.

4.2 parts of the above 4-amino-6-acetylaminoquinoline are suspended in 30 parts of nitrobenzene and the mixture heated at 100° C. 2.73 parts of dimethyl sulphate are gradually added with stirring and the mixture is heated at 100° C. for 2 hours. The solid which separates is filtered off, after cooling, and washed free from nitrobenzene with acetone. This crude 4-amino-6-acetylaminoquinoline methosulphate is boiled with 14 parts of concentrated hydrochloric acid and 7 parts of water for 10 minutes, and the hot solution neutralised with sodium carbonate. Addition of sodium iodide to the resulting solution precipitates 4:6 - diaminoquinoline methiodide which is filtered off and washed with a little cold water. It crystallises from water as yellow-orange crystals, M. P. 254–255° C.

*Example 9*

3.15 parts of 2:6-diaminolepidine methiodide, 2.85 parts of 4-chloro-2-amino-6-methylpyrimidine 1-methiodide, and 20 parts of 1.80% hydrochloride acid are boiled together under reflux for 30 minutes. After cooling, the product is filtered off and washed with a little ice-cold water. It is then dissolved in 150 parts of hot water and an excess of sodium iodide is added to precipitate 2-amino - 6-(2' - amino-6'-methylpyrimidyl-4'-amino) lepidine 1:1'-dimethiodide which crystallises from water as pale yellow crystals, M. P. 330° C. (decomp.).

The starting material 2:6-diamino lepidine methiodide is prepared as follows:

1 part of 2-chloro-6-nitrolepidine (Johnson and Hamilton, J. Amer. Chem. Soc., 1941, 63, 2867), 1 part of acetamide and 3 parts of phenol are mixed and heated to 170° C. by means of an oilbath. Gaseous ammonia is passed into the mixture for 3 hours at this temperature and heating at 170° C. is then continued for a further 2 hours. The reaction mixture is then cooled and an excess of dilute sodium hydroxide solution is added. The precipitate is filtered off and washed with water until free from alkali, It is then dissolved in 40 parts of boiling 6% aqueous hydrochloric acid, the solution treated with carbon, filtered and the filtrate made alkaline with an excess of aqueous sodium hydroxide solution to precipitate 2-amino-6-nitrolepidine, M. P. 304–307° C. The yield is 76%. The pure compound is obtained by crystallisation from ethyl alcohol and has M. P. 306–308° C.

6 parts of 2-amino-6-nitrolepidine and 50 parts of nitrobenzene are stirred together at 95–100° C. while 3 parts of dimethyl sulphate are gradually added. Stirring and heating are continued for 12 hours. The reaction mixture is then cooled and the solid is filtered off and washed with acetone. The crude methosulphate so obtained is dissolved in 60 parts of hot water, the solution treated with carbon and filtered. The filtrate is treated with an excess of sodium chloride to precipitate 2-amino-6-nitrolepidine-methochloride. This crystallises from 50% ethyl alcohol as pale yellow crystals, which decomposes at 320° C. The corresponding methiodide crystallises from ethyl alcohol as pale yellow crystals, M. P. 270–272° C.

2-amino-6-nitrolepidine methochloride is reduced with iron and hydrochloric acid in 50% methyl alcohol solution. The reaction mixture is neutralised with sodium carbonate and filtered. Addition of sodium iodide to the filtrate precipitates 2:6-diaminolepidine methiodide which crystallises from 50% ethyl alcohol as deep yellow crystals M. P. 285–286° C.

Example 10

17.05 parts of 4-amino-6-acetylaminoquinaldine 1-metho-methylsulphate is dissolved in 150 parts of water and 29.6 parts of hydrochloric acid and the solution is heated at 95–100° C. for 1 hour. The solution is then partly neutralised with 14.4 parts of anhydrous sodium carbonate to pH 2-3 while maintaining the temperature at 95–100° C. To this solution is added 13.45 parts of 4-chloro-2-amino-6-methylpyrimidine-1-methomethylsulphate at 90–100° C. and the mixture is stirred at 90–100° C. for 15 minutes. The product which separates is filtered off while still hot and washed first with 10 parts of 0.1 N hydrochloric acid and then with 100–200 parts of water until the washings are no longer acid to Congo red. The product is dried at 70° C. and consists of 4-amino-6-(2'-amino-6'-methylpyrimidyl-4'-amino)quinaldine 1:1'-dimethochloride which can be recrystallised from hot water and has M. P. 316–317° C. (decomp.).

Example 11

34 parts of 4-amino-6-acetylaminoquinaldine methomethylsulphate and 29 parts of 4-chloro-2-amino-6-methylpyrimidine 1-methiodide are suspended in 500 parts of water and 41 parts of 10N-hydrochloric acid are added. The mixture is then refluxed for 15 minutes, filtered while still hot and the solid is washed with 200 parts of 0.1N hydrochloric acid. It is then washed acid free (to Congo red) with water, dissolved in 3000 parts of boiling water and a hot solution of 150 parts of sodium chloride in 450 parts of water is added. There is thus precipitated 4-amino-6-(2'-amino-6'-methylpyrimidyl-4'-amino)quinaldine 1:1'-dimethochloride which is collected by filtration hot, washed with 2000 parts of cold water and dried. It has M. P. 316–317° C.

Example 12

20.3 parts of 4:6-diaminoquinaldine, 17.2 parts of 4-chloro-2:6-diaminopyrimidine-3-methiodide, 55 parts of 2N-hydrochloric acid and 90 parts of water are boiled together under reflux for 17 hours. After cooling, the precipitated product is filtered off, dissolved in 500 parts of water and the solution treated hot with excess sodium iodide. The product is then again filtered off and crystallised from water to give 4-amino-6-(2':6'-diaminopyrimidyl-4'-amino)quinaldine-3'-methiodide hydriodide which has M. P. 299–300° C.

Example 13

3.3 parts of 4:6-diaminoquinaldine ethiodide, 2.85 parts of 4-chloro-2-amino-6-methylpyrimidine 1-methiodide, 5 parts of 2N-hydrochloric acid and 33 parts of water are boiled together under reflux for 1 hour. After cooling, the product which separates is filtered off and washed with a little water. It is dissolved in 150 parts of hot water, the solution made alkaline with sodium carbonate and excess sodium iodide is added. The precipitated product is collected and crystallised from 50% alcohol/water to give 4-amino-6-(2'-amino-6'-methylpyrimidyl-4'-amino)quinaldine 1-ethiodide 1'-methiodide as pale yellow crystals, M. P. 279° C. (decomp.).

The starting material 4:6-diaminoquinaldine ethiodide is made in the following way:

21.5 parts of 4-amino-6-acetylaminoquinaldine and 280 parts of nitrobenzene are stirred together at 100° C. and 16.4 parts of diethyl sulphate added gradually over ¼ hour. After heating at 100° C. for a further 3 hours the reaction mixture is cooled and the product which has separated is filtered off and washed with acetone. It is dissolved in 150 parts of water, the solution carbon treated and a solution of sodium iodide added, the precipitated 4-amino-6-acetylaminoquinaldine ethiodide is filtered off and crystallised from 50% alcohol. It has M. P. 316° C. (decomp.).

7.8 parts of the above 4-amino-6-acetylaminoquinaldine ethiodide, 14 parts of concentrated hydrochloric acid and 7 parts of water are boiled together for 15 minutes. The product which separates is filtered off when cold and washed with acetone. It is then dissolved in 100 parts of warm water, the solution made alkaline with sodium carbonate and treated with sodium iodide. The precipitated 4:6-diaminoquinaldine ethiodide is filtered off, washed with a little cold water and crystallised from 50% alcohol. It forms yellow prisms, M. P. 220–221° C.

We claim:

1. Quaternary salts of the pyrimidylaminoquinoline derivatives having the general formula:

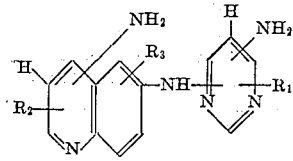

wherein $R_1$ is a radical from the group consisting of hydrogen, amino and lower alkayl, and $R_2$ and $R_3$ are radicals from the group consisting of hydrogen and lower alkyl.

2. New pyrimidylaminoquinoline derivatives of the formula:

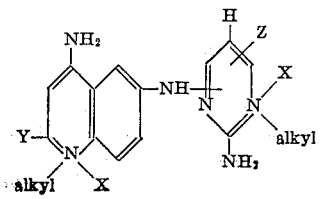

wherein X is an anionic radical, Y is a radical from the group consisting of hydrogen and methyl, and Z is a radical from the group consisting of hydrogen, amino, and methyl.

3. New pyrimidylaminoquinoline derivatives of the formula

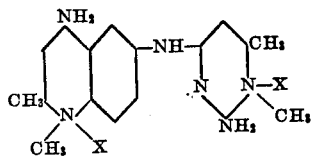

wherein X stands for an anionic radical.

4. New pyrimidylaminoquinoline derivatives of the formula

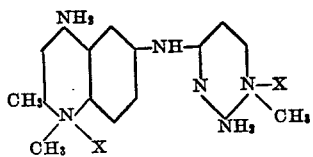

wherein X stands for an anionic radical.

5. New pyrimidylaminoquinoline derivatives of the formula

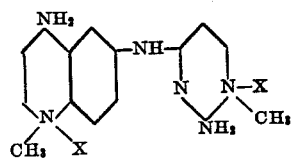

wherein X stands for an anionic radical.

6. The new compound of the formula

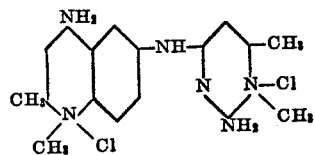

7. The new compound of the formula

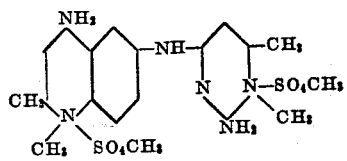

8. The new compound of the formula

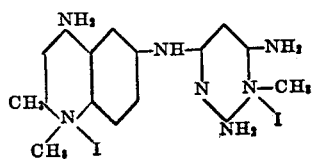

9. New pyrimidylaminoquinoline derivatives of the formula:

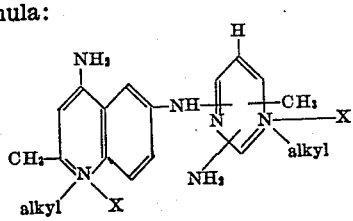

wherein X is an anionic radical.

10. New pyrimidylaminoquinoline derivatives of the formula:

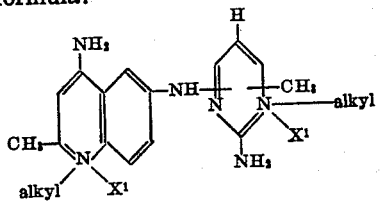

wherein X' is a halogen radical.

11. Process for the manufacture of the salts claimed in claim 1, which comprises reacting a compound of the formula:

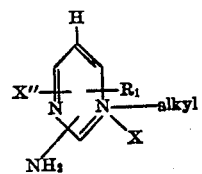

wherein X is an anionic radical, X'' is a radical from the group consisting of halogen and alkylthio and $R_1$ is a radical from the group consisting of hydrogen, amino and lower alkyl, with a compound from the group consisting of the free base form and quaternary salts of an amino compound of the formula:

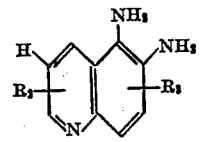

wherein $R_2$ and $R_3$ are radicals from the group consisting of hydrogen and lower alkyl.

ARTHUR DONALD AINLEY.
FRANCIS HENRY SWINDEN CURD.

REFERENCES CITED

The following references are of record in the file of this patent:

UNITED STATES PATENTS

| Number | Name | Date |
|---|---|---|
| 2,068,824 | Schonhofer et al. | Jan. 26, 1934 |
| 2,295,563 | D'Alelio | Sept. 15, 1942 |

OTHER REFERENCES

Curd et al., J. Chem. Soc., 1613–1619 (1947).
Gabriel et al., Ber. Deut. Chem. 34, 1235 (1901).